United States Patent Office 3,649,442
Patented Mar. 14, 1972

3,649,442
METHOD FOR PREPARING LAMINAR WOOD STRUCTURES
Duane L. Kenaga, Midland, Mich., assignor to The Dow Chemical Company, Midland, Mich.
No Drawing. Filed Oct. 31, 1969, Ser. No. 873,120
Int. Cl. B32b 21/08
U.S. Cl. 161—184
4 Claims

ABSTRACT OF THE DISCLOSURE

A method for bonding wood surfaces, which have a hard, smooth, water and stain-repellent impregnant to produce laminate and plywood structures having good bond strengths which comprises impregnating at least one ply of wood, which may be an outer ply, or laminate with a vinyl aromatic monomer, an acrylate monomer and/or methacrylate monomer or mixture thereof associated with a catalyst and/or cross-linking agent, curing the monomer in the wood, then treating the surface with a solvent and/or a polyethyleneimine having an average molecular weight from about 10,000 to 100,000; and in the case of preparing laminar surfaces, spreading one surface with a non-aqueous formulated adhesive (e.g., epoxy resin adhesive) laying up the laminate and curing the adhesive under pressure.

BACKGROUND OF INVENTION

Various techniques have been disclosed for producing resin impregnated surface veneer plywood, particularly ponderosa, white pine and parquet flooring and the like. These wood-plastic composites have good surface characteristics, i.e., hard, smooth, water and stain-repellency. The principal difficulty with most of these treatments is that the wood-plastic composite is not easily bonded to itself or to untreated cores. Treatment of but one side of a ply having a veneer already bonded is unsatisfactory since treatment cannot be confined to the single surface.

It is therefore an object of the present invention to provide a process for treating a surface veneer or ply which has been impregnated with a monomer cured in the wood to make the surfaces suitable for bonding to prepare high bond strength laminates and plywood.

BRIEF DESCRIPTION OF INVENTION

In accordance with the present invention, a surface veneer is impregnated with a monomeric vinyl aromatic compound or an acrylate or methacrylate interpolymer, a cross-linking agent and/or a catalyst, subjected to curing and cross-linking conditions, the surface of the veneer which is to be bonded to the base plies is treated with toluene and/or a polyethyleneimine having a molecular weight from about 10,000 to 100,000, then coated with a non-aqueous formulated adhesive such as an epoxy resin or the like, and the plies pressed and cured.

Good results are obtained when a wood veneer is impregnated to form 20 to 95 percent by weight vinyl aromatic or acrylate resin pick-up, cured, the surface to be glued is washed with an aromatic solvent, such as toluene, and the washed surface brush-coated with a 0.5 to 10 percent solution (by weight) of a polyalkylene polyamide (e.g., polyethyleneimine, M.W. 1,800 to 100,000) prior to gluing and lay-up with any of the conventional adhesives in the conventional plywood presses. The shear strength of laminates prepared in this manner have higher values and greater wood failure than veneers treated in conventional manners, e.g., 30 to over 200 percent greater shear strength and 2 to 10 times the wood failure than conventional procedures.

Suitable vinyl aromatic monomers for impregnating the surface veneer are styrene, vinyl toluene, divinyl toluene and $C_{2-4}$ alkyl styrenes, e.g., t-butylstyrene and mixtures thereof. Suitable comonomers are the vinyl acids such as acrylic and methacrylic acids and esters and the vinyl ketones.

The conventional catalysts and cross-linking agents known in the art to cure the monomers are employable. Catalysts such as azobisisobutyronitrile, the peroxides, such as benzoyl peroxide, and the cross-linking agents such as divinylbenzene and ethylene glycol dimethacrylate are suitable.

Polyalkyleneimines suitable for use are those well known in the literature and preferably those having molecular weights of from about 1,800 to about 100,000 when applied as 0.5 to 10% aqueous solutions (by weight).

DETAILED DESCRIPTION OF INVENTION

Example 1

Hard maple boards 1 inch thick by 3 inches wide and 36 inches long were impregnated with a solution of 95 weight percent tertiary butyl styrene and 5 weight percent divinylbenzene containing 0.25% azobisisobutyronitrile as curing agent. The so-impregnated boards were cured at 90° C. for 180 minutes. The boards had an average of 60% weight pick-up after cure.

One board was coated with an epoxy resin adhesive and bonded to a like-treated maple board. The bonded boards were cured for 20 hours in a cold press (frame under 100 p.s.i. pressure).

Another impregnated board was washed with toluene, the toluene evaporated, the toluene treated surface coated with adhesive and glued as before.

A third board was treated with a polyethyleneimine, then glued as above.

Finally, a fourth board was washed with toluene, then treated with a polyethyleneimine and then glued. The results of shear tests conducted on 2 inch by 1 inch specimens cut from each assembly are set forth below:

| Block | Treatment Toluene wash | PEI | P.s.i.[1] | Percent wood failure |
|---|---|---|---|---|
| 1 | | | 526 | 0 |
| 2 | x | | 1,240 | 20 |
| 3 | | x | 1,273 | 10 |
| 4 | x | x | 1,744 | 40 |

[1] Average of three specimens.

In another series of tests, specimens were prepared according to the four procedures as above but were clamped for 48 hours and held for two weeks prior to cutting. The results of shear tests on three 1 inch by 2 inch specimens were as follows:

| | | PSI | Percent wood failure |
|---|---|---|---|
| A | Untreated, average of 3 | 1,253 | 5 |
| B | Toluene wash, average of 3 | 2,288 | 10 |
| C | {PEI treated, 1 specimen | 2,043 | 10 |
| | {PEI treated, average of 2 specimens | 2,800 | ([1]) |
| D | PEI toluene, average of 3 | 2,832 | ([1]) |

[1] Exceeded capacity of 5,000 lbs. test machine. Specimen did not break at this load.

Example 2

Birch veneer skins were prepared by impregnation with a tertiary butyl styrene-divinylbenzene-catalyst composition as in Example 1; cured at 90° C. for 180 minutes; the surfaces washed with a 1% solution of a polyethyleneimine having a molecular weight of about 30–50,000 (PEI–50); and glued to ⅛ inch untreated Douglas Fir veneer core to produce a 3 ply cross-bonded panel. The glue or adhesives employed were commercial grades of epoxy resins based on glycidyl polyethers of bisphenol A and an amine curing agent employed as recommended by the manufacturer. The glued panels were either hot pressed, 2 panels per press, under 200 p.s.i.g. at 100° C. for 10 minutes, or cold pressed under 200 p.s.i.g. for 20 hours at room temperature. Dry shear strength data of the panels is given below. Controls were run in which no washing or treatment of the impregnated birch veneer was done.

| Pretreatment | Days prior to shear test | Dry shear strength, p.s.i.g. | | | |
|---|---|---|---|---|---|
| | | Resin A | | Resin B | |
| | | Hot | Cold | Hot | Cold |
| None | 1 | 178 | 133 | 185 | 211 |
| | 7 | 184 | 162 | 200 | 202 |
| PEI-50 | 1 | 173 | 164 | 194 | 220 |
| | 7 | 206 | 220 | 227 | 206 |

Example 3

In a similar manner using various molecular weight polyethyleneimines, the following results were obtained:

| PEI | M.W. | Press shear strengths, p.s.i. | |
|---|---|---|---|
| | | Hot | Cold |
| 50 | 30-50,000 | 184 | 224 |
| 18 | 1,800 | 225 | 247 |
| 100 | 100,000 | 225 | 247 |

I claim:

1. A method for preparing laminar wood structures which have a hard, smooth, water and stain-repellent surface which comprises impregnating at least one ply or lamina which is at least one outer ply with a vinyl monomer selected from the group consisting of vinyl aromatics, vinyl acids, vinyl esters and a catalyst or cross-linking agent; curing the monomer in the ply, treating the surface with at least one of a polyethyleneimine or toluene, the polyethyleneimine having a molecular weight of from 1,800 to 100,000; and gluing with a non-aqueous adhesive, the so-treated ply to at least one other ply under pressure.

2. A method for preparing laminar wood structures which have a hard, smooth, water and stain-repellent surface which comprises impregnating at least one ply or lamina which is at least one outer ply with a tertiary butyl styrene and divinylbenzene and azobisisobutyronitrile as a catalyst; curing the monomer in the ply, treating the surface with tolene and/or polyethyleneimine, the polyethyleneimine having a molecular weight of from 1,800 to 100,000; and gluing the so-treated ply with an epoxy resin adhesive to at least one other ply under pressure.

3. The method of claim 2 wherein said treatment of the impregnated ply employs first a toluene wash followed by a polyethyleneimine wash.

4. The laminar structure prepared in accordance with claim 1.

References Cited

UNITED STATES PATENTS 3,480,506  11/1969  Hart et al. _____ 161—270
3,168,427  2/1965  Nagle et al. _____ 156—307
3,522,125  7/1970  Talbott et al. _____ 161—270

OTHER REFERENCES

G. S. Brady, Materials Handbook, 9th edition, 1963, McGraw-Hill Book Co., New York, pp. 282, 283, 590, 591, 597, 598, 804.

REUBEN EPSTEIN, Primary Examiner

U.S. Cl. X.R.

156—308, 330; 161—250, 251, 270